US007908099B2

(12) United States Patent
Behar et al.

(10) Patent No.: US 7,908,099 B2
(45) Date of Patent: Mar. 15, 2011

(54) LEAK DETECTION METHOD AND ASSOCIATED VALVE AND FUEL SYSTEM

(75) Inventors: Ron Behar, Williamsport, PA (US); Eric Grant, Ypsilanti, MI (US); Ryan McCleary, White Lake, MI (US); David Hill, Commerce Township, MI (US); Scott Garabedian, Warren, MI (US); Saurin Mehta, Powell, OH (US); Kevin Slusser, Rochester, MI (US); Dave Dirkson, Windsor (CA)

(73) Assignee: Inergy Automotive Systems Research (S.A.), Brussels (BE)

( * ) Notice: Subject to any disclaimer, the term of this patent is extended or adjusted under 35 U.S.C. 154(b) by 0 days.

(21) Appl. No.: 12/162,439

(22) PCT Filed: Feb. 5, 2007

(86) PCT No.: PCT/EP2007/051056

§ 371 (c)(1),
(2), (4) Date: Dec. 1, 2008

(87) PCT Pub. No.: WO2007/090802

PCT Pub. Date: Aug. 16, 2007

(65) Prior Publication Data

US 2009/0099795 A1 Apr. 16, 2009

Related U.S. Application Data

(60) Provisional application No. 60/765,741, filed on Feb. 7, 2006, provisional application No. 60/854,101, filed on Oct. 25, 2006.

(30) Foreign Application Priority Data

Feb. 7, 2006 (EP) .................................... 06101356

(51) Int. Cl.
*G01F 17/00* (2006.01)

(52) U.S. Cl. ........................................................ 702/51

(58) Field of Classification Search .................... 702/51; 73/114.39, 114.41, 49.7
See application file for complete search history.

(56) References Cited

U.S. PATENT DOCUMENTS 3,460,522 A 8/1969 Kittler et al.
(Continued)

FOREIGN PATENT DOCUMENTS

EP 1757793 A1 2/2007
(Continued)

OTHER PUBLICATIONS

PCT Search Report dated Apr. 13, 2007 for International Application No. PCT/EP2007/051056 (4 p.).

(Continued)

*Primary Examiner* — Drew A Dunn
*Assistant Examiner* — Stephen J Cherry
(74) *Attorney, Agent, or Firm* — Oblon, Spivak, McClelland, Maier & Neustadt, L.L.P.

(57) ABSTRACT

Method of detecting a leak in a fuel system comprising a fuel tank and an orifice with a controlled section between the tank and the atmosphere, according to which a) the controlled section is set to a value $A_l$ at a time $T_1$ and a pressure differential $\Delta p_1$ between the inside of the tank and the atmosphere is measured at least after an interval of time $\Delta T$ from $T_1$, for a constant fuel flow out of the tank;
b) the controlled section is set to a value $A_2$ at a time $T_2$ and a pressure differential $\Delta p_2$ between the inside of the tank and the atmosphere is measured at least after the same interval of time $\Delta T$ from $T_2$, for the same constant fuel flow;
c) a ratio of the pressure differentials $\Delta p_1$ and $\Delta p_2$ is computed and is compared to a reference pressure differential ratio $\Delta p_L$ obtained with the same fuel system but comprising a calibrated leak.

12 Claims, 4 Drawing Sheets

U.S. PATENT DOCUMENTS

| | | | | |
|---|---|---|---|---|
| 4,148,340 | A * | 4/1979 | Hutton | 137/599.07 |
| 4,270,504 | A | 6/1981 | Sciotti et al. | |
| 4,887,578 | A | 12/1989 | Woodcock et al. | |
| 5,116,257 | A | 5/1992 | Szlaga | |
| 5,347,971 | A * | 9/1994 | Kobayashi et al. | 123/520 |
| 5,637,788 | A | 6/1997 | Remboski et al. | |
| 5,647,334 | A | 7/1997 | Miller | |
| 5,878,727 | A | 3/1999 | Huls | |
| 5,964,812 | A | 10/1999 | Schumacher et al. | |
| 6,105,556 | A | 8/2000 | Takaku et al. | |
| 6,167,920 | B1 | 1/2001 | Enge | |
| 6,253,802 | B1 | 7/2001 | Enge | |
| 6,276,343 | B1 | 8/2001 | Kawamura et al. | |
| 6,311,548 | B1 | 11/2001 | Breidenbach et al. | |
| 6,314,797 | B1 | 11/2001 | Dawson et al. | |
| 6,334,355 | B1 | 1/2002 | Grieve et al. | |
| 6,382,017 | B1 | 5/2002 | Majkowski et al. | |
| 6,443,190 | B1 | 9/2002 | Enge | |
| 6,516,835 | B2 | 2/2003 | Enge | |
| 6,601,617 | B2 | 8/2003 | Enge | |
| 6,722,187 | B2 | 4/2004 | Grieve et al. | |
| 6,823,850 | B1 | 11/2004 | Hurley | |
| 2001/0004844 | A1 | 6/2001 | Yamaki | |
| 2005/0044939 | A1 | 3/2005 | Kobayashi et al. | |
| 2005/0211228 | A1 | 9/2005 | Amano et al. | |
| 2007/0233360 | A1 | 10/2007 | Hill et al. | |
| 2007/0272219 | A1 | 11/2007 | Hill | |
| 2008/0047532 | A1 | 2/2008 | Hill | |
| 2009/0056680 | A1 | 3/2009 | Hill et al. | |
| 2009/0063027 | A1 | 3/2009 | Grant et al. | |
| 2009/0078239 | A1 | 3/2009 | Hill et al. | |
| 2009/0114288 | A1 | 5/2009 | Grant et al. | |
| 2009/0150041 | A1 | 6/2009 | Hill et al. | |
| 2009/0187327 | A1 | 7/2009 | Grant et al. | |
| 2009/0314072 | A1 | 12/2009 | Slusser et al. | |

FOREIGN PATENT DOCUMENTS

| | | | |
|---|---|---|---|
| WO | WO2006072633 | A1 | 7/2006 |
| WO | WO2006087376 | A1 | 8/2006 |
| WO | WO2007099149 | A1 | 9/2007 |

OTHER PUBLICATIONS

European Patent Office Search Report dated Jun. 30, 2006 for European Application No. 06101356.1 (2 p.).

* cited by examiner

LEAK DETECTION METHOD AND ASSOCIATED VALVE AND FUEL SYSTEM

CROSS-REFERENCE TO RELATED APPLICATIONS

The present application is a U.S. national stage application under 35 U.S.C. §371 of International Application No. PCT/EP2007/051056, filed Feb. 5, 2007, which claims the benefit of U.S. provisional application Ser. No. 60/765,741 filed Feb. 7, 2006, of European patent application serial No. 06101356.1 filed Feb. 2, 2006, and of U.S. provisional application Ser. No. 60/854,101 filed Oct. 25, 2006, all of these applications being herein incorporated by reference in their entirety for all purposes.

TECHNICAL FIELD

The present invention relates to a leak detection method and a leak detection system for a fuel system.

BACKGROUND

Increasing the safety of currently used fuel tanks, involves the prevention or minimization of fuel vapour leaks. Both the Environmental Protection Agency (EPA) and the California Air Resources Board (CARB), specify the requirement of On-Board Diagnostic II (OBD II) for the check for evaporative emission system for leaks. This requires detecting system leaks equivalent to an orifice larger than 0.5 mm (0.020 inch) in diameter for vehicles produced starting model year 2000.

A fuel tank generally contains fuel in gaseous and liquid form. In particular conditions, e.g. raise of temperature, a dangerous build-up of pressure may occur inside the fuel tank. For that reason it is advantageous to vent the fuel tank, providing there is no emission of hydrocarbons to the atmosphere.

In order to prevent this emission, the fuel tank is generally vented using an evaporative emission control system comprising in general a vapour canister containing an adsorptive material (e.g. charcoal), through which fuel vapours escaping from the fuel tank are directed.

Leaks in the fuel tank or at the interface between the fuel tank and components (e.g. canister, valves, . . . ) may exist and their presence must be checked.

PRIOR ART

Current technologies involving leak detection are separated into detection of very small, small and gross leaks. Small leak detection relates to the detection of a leak equivalent to an opening having a diameter smaller than 1 mm (0.040 inch), and gross leaks detection relates to the detection of a leak equivalent to an opening having a diameter greater or equal to 12 mm (0.5 inch) and corresponding to a fuel cap off condition, i.e. the filler pipe is not closed on the fill side. The detection of very small leaks corresponds to the detection of a leak equivalent to an opening with a diameter of about 0.5 mm (0.020 inch).

Prior inventions for detecting leaks use concepts of pressure levels and/or vacuum levels in the fuel tank. Some of them also use purge concepts to do the measurements.

An example of very small leak detection method in an evaporative emission control system is revealed in U.S. Pat. No. 5,637,788. As a first step of the detection method, a vapour flow rate in a fuel tank is measured while a differential pressure between the inside of the fuel tank and the atmosphere is zero. Because the differential pressure across the tank is zero, there is no flow through any leaks in the tank but there is only a flow rate indicative of a vapour generation rate. The next step of the method is to measure the flow rate at another differential pressure achieved by pulling the vacuum on the fuel tank. At the lower differential pressure, flow will develop through any leaks in the tank in addition to flow due to vapour generation. Both flow measurements are then subtracted, the result being indicative of a leak flow, so that the vapour flow is cancelled out. Statistical processing or filtering can be used to account for fluctuations of the vapour flow during the measurements. The cost of the detection method is high since additional processing devices are to be implemented.

Additionally, known prior art methods for leak detection are generally carried out when the engine has been turned off. It is in particular the case with the method described in U.S. Pat. No. 6,314,797.

SUMMARY OF THE INVENTION

To avoid the drawbacks of prior art, the applicant's invention relates to a system using existing technology, i.e. current components of the fuel system with no need for any additional sensors, or devices. It does not require any additional devices, volumes, or changes to the normal day to day operation of the vehicles. With the help of an intelligent fuel system or IFS (i.e. a fuel system comprising a fuel system control unit (FSCU) and data network connection), the present invention allows a continuous and accurate detection of leaks (even small leaks) in a fuel system based on the measurement of pressure differentials, which does not burden neither the cost nor the efficiency of the result since the IFS uses only existing sensors to perform the leak detection.

DESCRIPTION OF THE INVENTION

Figure 1:
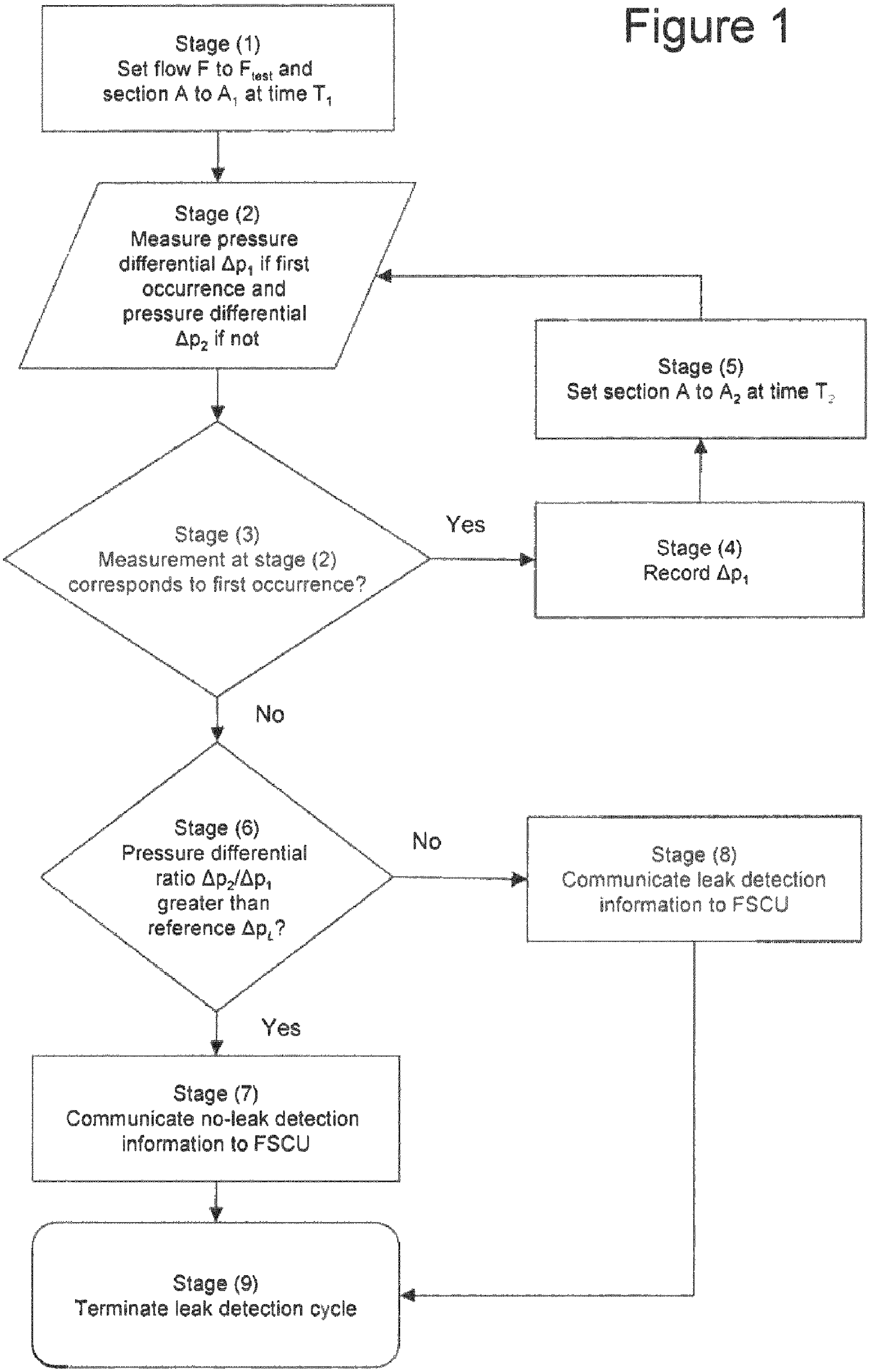
FIG. 1 shows a flow chart of a leak detection cycle according to an embodiment of the present invention.

To this effect the present invention relates to a method of detecting a leak in a fuel system comprising a fuel tank and an orifice with a controlled section between the tank and the atmosphere, according to which:

a) the controlled section is set to a value $A_1$ at a time $T_1$ and a pressure differential $\Delta p_1$ between the inside of said fuel tank and the atmosphere is measured at least after an interval of time $\Delta T$ from $T_1$, for a constant fuel flow F out of said fuel tank;

b) the controlled section is set to a value $A_2$ at a time $T_2$ and a pressure differential $\Delta p_2$ between the inside of said fuel tank and the atmosphere is measured at least after the same interval of time $\Delta T$ from $T_2$, for the same constant fuel flow F;

c) a ratio of said pressure differentials $\Delta p_1$ and $\Delta p_2$ is computed and is compared to a reference pressure differential ratio $\Delta p_L$ obtained with the same fuel system but comprising a calibrated leak.

According to the invention, the fuel system comprises a fuel tank.

The fuel tank is a hollow body of varying shapes, which may be equipped with various internal or external accessories, and even accessories passing through the wall of the chamber.

The fuel tank according to the invention may be made of any composition or material compatible with the fuels and the habitual conditions of use. It may, for example, be made of a material the composition of which contains at least one metal or one plastic. The invention gives good results with fuel tanks made of polymeric material. The polymeric material is preferably selected from the group consisting of polyethylene, polyethylene terephthalate, polybutylene terephthalate, polyamide, polyoxymethylene, polypropylene, elastomers and mixtures of two or more thereof. Preferably, the polymeric material comprises high density polyethylene (HDPE). In a specific embodiment, the hollow element also comprises a layer of barrier material like EVOH (at least partially hydrolysed ethylene-vinyl acetate copolymers). Alternatively, the HDPE may be surface treated (by fluorination, sulphonation or the like) in order to reduce its permeability to fuel.

According to the invention the fuel system comprises also an orifice with a controlled section between the tank and the atmosphere, i.e. a section that can be modified and set to a specified value in a controlled way.

At stages a) and b) of the method according to the invention, the flow of fuel F out of the tank is constant, i.e. it is controlled in such a way as to stay equal to a pre-set test value $F_{test}$.

The reference pressure differential ratio APL according to step c) of the method is obtained in the same manner as the ratio of pressure differentials $\Delta p_1$ and $\Delta p_2$: it is computed as the ratio of two pressure differentials corresponding to the values $A_1$ and $A_2$ of the controlled section, to the same fuel flow $F_{test}$ and measured in the same manner as $\Delta p_1$ and $\Delta p_2$.

The reference pressure differential ratio APL is obtained with the same fuel system but comprising a calibrated leak. This calibrated leak is chosen so as to apply requirements of standardized leak tests (e.g. in OBD II tests): e.g. an orifice diameter of 0.5 mm for small leaks may be chosen as a maximum leak section acceptable to pass the OBD II tests.

The fuel system of the invention preferably comprises an evaporative emission control system aimed at controlling the emission of fuel vapour generated in the fuel tank. The evaporative emission control system generally comprises a fuel vapour canister filled with adsorbent material (e.g. charcoal) that captures hydrocarbons from the fuel vapour; a venting line equipped with one or several roll-over-valves (ROV) communicating the fuel tank with the fuel vapour canister; a purge line and a valve between the canister and the engine, and a vent port between the canister and the atmosphere.

According to a first embodiment, this evaporative emission control system comprises an electronically controlled electromechanical valve, of the type described in patent application PCT/EP2006/05008 published under WO 2006/072633, the content of which being included herein by reference.

In particular, the electromechanical valve comprises a stationary outer housing comprising at least three bores, and a translating inner section which translates along the primary axis of the outer housing and which comprises adequate bores defining with the bores of the housing at least three ports of the valve.

This electromechanical valve acts as a venting valve and is normally open so that the canister collects hydrocarbon vapour generated by the fuel in the tank. When used in the frame of the invention, it connects the tank and the canister either through a large venting orifice or through a small venting orifice.

The orifice of controlled section is preferably between the fuel tank and the canister, and the controlled section is controlled by the electromechanical valve.

The electromechanical valve may also act as a purge valve, normally closed, and is modulated to draw the vapour out of the canister for ingestion in an engine intake system, in general either when the engine turns at normal speed or when the engine turns at idle speed.

Generally, said evaporative emission control system also includes a vent port and a vent line connecting the canister to the atmosphere. It is namely so that when the fuel vapour/air mixture coming from the fuel tank passes through the canister, it is separated, i.e. only the fuel vapour is absorbed on the adsorbent material while the air is not. Since this air is clean, it can be sent back to the atmosphere, which is done through the vent port. The vent port also allows air to come into the fuel system.

According to another, preferred embodiment of the invention, the orifice of controlled section is in between the vent port of the canister and the atmosphere and even more preferably, the controlled section is part of a vent valve having 2 functions: allowing to vent the tank during normal service and during refueling, and controlling the vent section to perform the OBD test.

According to a preferred embodiment of the invention, the fuel system comprises a fuel system control unit (FSCU) and the method of the invention is performed by the FSCU. This can also be controlled by the ECU if the vehicle is not equipped with a FSCU.

The FSCU can manage the operating conditions and functioning parameters of the fuel system. The FSCU generally has means for controlling functions of the fuel system, is connected with at least one fuel system component to send signals or receive signals from said at least one fuel system component, is connected with at least one sensor that sends signals to the FSCU and/or receives signals from an engine control unit (ECU), is adapted to electronically and bi-directionally communicate with the ECU.

The FSCU preferably is a standalone controller, different from the ECU and which has taken over the control of the fuel system from the ECU, i.e. the ECU does not directly control the fuel system any longer. The FSCU communicates with the ECU also for indication of any fuel system failure to the ECU.

The FSCU preferably controls the operation of all components integrated in the fuel system during normal and transient operating conditions of the engine, receives data on the operating parameters and sends information to make the components function. In general this control was previously made by the ECU or by component-dedicated electronic controllers (for instance, dedicated controllers for fuel pump management). The burden of controlling the fuel system is preferably switched to the FSCU.

The FSCU may also control the vapour management in the fuel system. The purging of the fuel vapour canister may be under the control of the FSCU. This control can be dealt with through the purge valve (e.g. three-way switching valve embodied in a solenoid actuator) that allows communication between the canister and the engine air intake system. The actuator opens the purge valve under a predetermined operating condition of the engine to connect the canister and the air intake system, thereby generating a purge gas flow through the canister.

The FSCU advantageously also communicates with the ECU preferably via the vehicle CAN bus since this communication medium is less sensitive to electronic bugs. Through this multiplex bus, the ECU sends messages to the FSCU to enable the fuel pump, to control the output pressure of the fuel pump if a variable speed fuel pump is provided, to disable the fuel pump in the event of a vehicle accident, to control the purging of the vapour canister, to indicate the ambient temperature, to indicate the engine temperature and to request information from one or more sensors such as OBD sensors.

It is preferred that the FSCU is a low power microprocessor, e.g. with a voltage of 5V or even 3.3V. This type of microprocessor may have advantageously the following allocations: a ROM of 128 kilobytes, a volatile memory of 4 kilobytes and a non-volatile memory of 2 kilobytes.

In particular the fuel system comprises other components like a fuel pump that controls said fuel flow, i.e. fuel is drawn from the fuel tank and is discharged from the fuel tank through an opening in the fuel tank wall.

The fuel pump is preferably controlled by the FSCU.

More preferably said fuel pump is controlled through a variable speed/variable pressure control program, as described in patent application EP 05107665, the content of which being included herein by reference.

The theory behind the present invention is the following. When fuel flows out of the fuel tank—corresponding to the consummation of the vehicle engine—the volume left empty by the fuel in the fuel tank is preferably replaced by an equivalent volume of fresh air coming from the evaporative emission control system, generally through the vent port. In order to avoid any deformation of the tank, the flow of air through an orifice depends generally on the orifice section according to the following relation:

$$\frac{dV}{dt} = A\sqrt{\frac{2\Delta p}{\rho}} \tag{1}$$

where dV/dt: air flow

A: orifice section $\Delta p$: pressure differential between the inside of the tank and the atmosphere $\rho$: air density A change in the orifice section A gives in turn a change in $\Delta p$, for a constant air density $\rho$. It is namely so that the application of relation (1) with two different testing conditions, i.e. ($A_1$, $\Delta p_1$) and ($A_2$, $\Delta p_2$), under the condition of constant fuel flow (and air flow accordingly), leads to the following relation $$\left(\frac{A_1}{A_2}\right)^2 = \frac{\Delta p_2}{\Delta p_1} \tag{2}$$

Since ratios are used, any dependency to environmental changes is diminished.

The method according to the invention allows a continuous leak detection even for very small leaks. This means that during a driving cycle, a leak detection test can be launched at any time without the need to turn off the engine.

Preferably the method according to the invention is included in an OBD test.

In an embodiment of the invention, the pressure differentials $\Delta p_1$ and $\Delta p_2$ are measured only once after the interval of time $\Delta T$ from respectively $T_1$ and $T_2$.

In another embodiment of the invention, a) said pressure differential $\Delta p_1$ is measured after successive intervals of time $\Delta T$ starting from $T_1$ in such a manner as to obtain one sequence of N measurements where N is a constant;

b) said pressure differentials $\Delta p_2$ is measured after successive intervals of time $\Delta T$ starting from $T_2$ in such a manner as to obtain one sequence of N measurements;

c) a sequence of N ratios of said pressure differentials $\Delta p_1$ and $\Delta p_2$ is computed from sequences of measurements obtained at stages a) and b), a numerical filter is applied to this sequence of N ratios in such a manner as to obtain a sequence of N filtered ratios, and said sequence of filtered ratios is compared to a sequence of N reference pressure differential ratios $\Delta p_L$ obtained with the same fuel system but comprising a calibrated leak.

Another object of the invention is a fuel system equipped with leak detection means and comprising:

a) a fuel tank;

b) an orifice with a controlled section between the tank and the atmosphere;

c) means for varying said controlled section between at least two values;

d) means for measuring a pressure differential between the inside of the tank and the atmosphere at said at least two values of said controlled section;

e) means for computing the ratio between the two pressure differentials measured at stage d) and for comparing said ratio with a reference pressure differential ratio obtained with the same fuel system but with a calibrated leak and the atmosphere.

According to a preferred embodiment, the means for varying the controlled section are included into a valve which is preferably located between a canister and the atmosphere and which is besides a vent valve as described above.

The present invention also concerns a vent valve as described above and allowing to vent the tank during normal service and during refueling, and to control the vent section to perform the OBD test. More particularly, it concerns a vent valve comprising:

a housing having at least one inlet orifice and at least 2 outlet orifices establishing at least 2 flow paths with different flow rates for a gas through the valve: one having a first restricted section A1 (I) and one having a second restricted section A2 (II);

a mobile part able to move inside said housing between 3 positions: one where it does not restrict the flow through the valve, one where it restricts it to flow path (I) and one where it restricts it to flow path (II).

Different solutions are available to obtain the different flow rates/paths. For instance, the housing could have 3 outlet orifices eventually of different sizes, the mobile part covering one, 2 or none of these orifices according to its position.

In a preferred embodiment, the mobile part comprises an orifice and has a geometry such that in one of its positions, the gas may flow around it and through the valve almost without flow rate restriction; and in the 2 other positions, the gas is forced through said orifice with an associated flow rate restriction of the gas though the valve. The flow rate variation between these 2 other positions is obtained though the 2 outlet orifices of the housing, one of which being closed by the mobile part in one of said positions and open in the other. Preferably, these orifices have different sizes: the smaller one being always open and the larger one being blocked by the mobile part in one of its positions.

This embodiment offers the advantage of a very small amount of travel (movement of the mobile part and hence, size of the housings and of the valve itself) while being able to accommodate very high flow rates.

The mobile part may be moved by any means. In a preferred embodiment, it is moved by a mere mechanical motor (like a stepper motor) and not by a solenoid for instance, which offers an advantage in terms of cost.

In a preferred embodiment, the valve comprises a housing in 2 parts in order to enable the mounting of the mobile part inside of it. Preferably, these 2 parts are:

- an outer part comprising at least 2 orifices: one inlet orifice through which a gas flow can enter the valve and one outlet orifice through which said gas flow can exist the valve, said outer housing defining an internal volume;
- an inner part disposed inside said internal volume, wherein the mobile part can slide and having at least 2 orifices establishing a communication between the inlet orifice and the outlet orifice of the outer housing.

In that embodiment, the inner part is the active one, the outer part providing a sealing surface for the inner part to seal on. The housing is preferably comprised of two pieces so that the mobile part can easily be installed. The outer housing can also be used as a housing for any type of filter media that is required, if necessary.

The 2 parts of the housing according to that embodiment may be assembled by any means, preferably in a way such that they can easily be (dis)assembled. Clips or snap fit connections give good results.

In order to have a leak tight assembly, it is preferable to foresee seals in the valve of the invention, at least between the assembly of the two parts of the housing (the case being) and between the housing and the mobile part. In a preferred embodiment, the later is overmoulded on at least one seal. Preferably, it is overmoulded on 2 seals: one on its upper surface and one on its lower surface.

The valve of the invention may be made of any material(s). Preferably, at least the housing and the mobile part are made of plastic. Plastics are namely light weight and they are easy to put in shape (mold). Their use also facilitates the overmoulding of the above mentioned seals for instance. More particularly, the housing can be made of POM (poly-oxy-methylene); the puck can be made of PA (polyamide) and the seals can be made of rubber (NBR). The actuator rod & housing are preferably of stainless steel.

FIGS. 1 to 5 illustrate the present invention but are not to be construed as limiting its scope.

FIG. 1 details a flow chart of a leak detection cycle according to an embodiment of the present invention.

The leak detection cycle is carried out for a fuel system comprising a fuel tank and an orifice with a controlled section A between the tank and the atmosphere. The cycle is started with stage (1) where a flow F of fuel out of the tank is set to a testing value $F_{test}$, and section A is set to a value $A_1$ at a time $T_1$.

During the whole leak detection cycle, the fuel flow is controlled by a fuel system control unit (FSCU).

At stage (2), a pressure differential $\Delta p_1$ between the inside of the fuel tank and the atmosphere is measured after an interval of time $\Delta T$ from $T_1$.

On the condition (verified at stage (3)) that the measurement at stage (2) corresponds to a first occurrence, said pressure differential $\Delta p_1$ is recorded at stage (4) and, at stage (5), the controlled section A is set at a time $T_2$ to a value $A_2$ different from $A_1$. From stage (5) the leak cycle is processed back to stage (2) where a pressure differential $\Delta p_2$ is measured after the same interval of time $\Delta T$ but from $T_2$.

Then, since condition at stage (3) is not fulfilled any longer, stage (6) is carried out where a ratio $\Delta p_2/\Delta p_1$ is computed and is compared to a reference pressure differential ratio $\Delta p_L$ obtained with the same fuel system but comprising a calibrated leak.

If the ratio $\Delta p_2/\Delta p_1$ is greater than the reference ratio $\Delta p_L$ then stage (7) is processed where a no-leak detection information is communicated to the FSCU. If the ratio $\Delta p_2/\Delta p_1$ is smaller than or equal to the reference ratio $\Delta p_L$ then stage (8) is processed where a leak detection information is communicated to the FSCU.

The leak detection cycle is terminated at stage (9).

Figure 2:
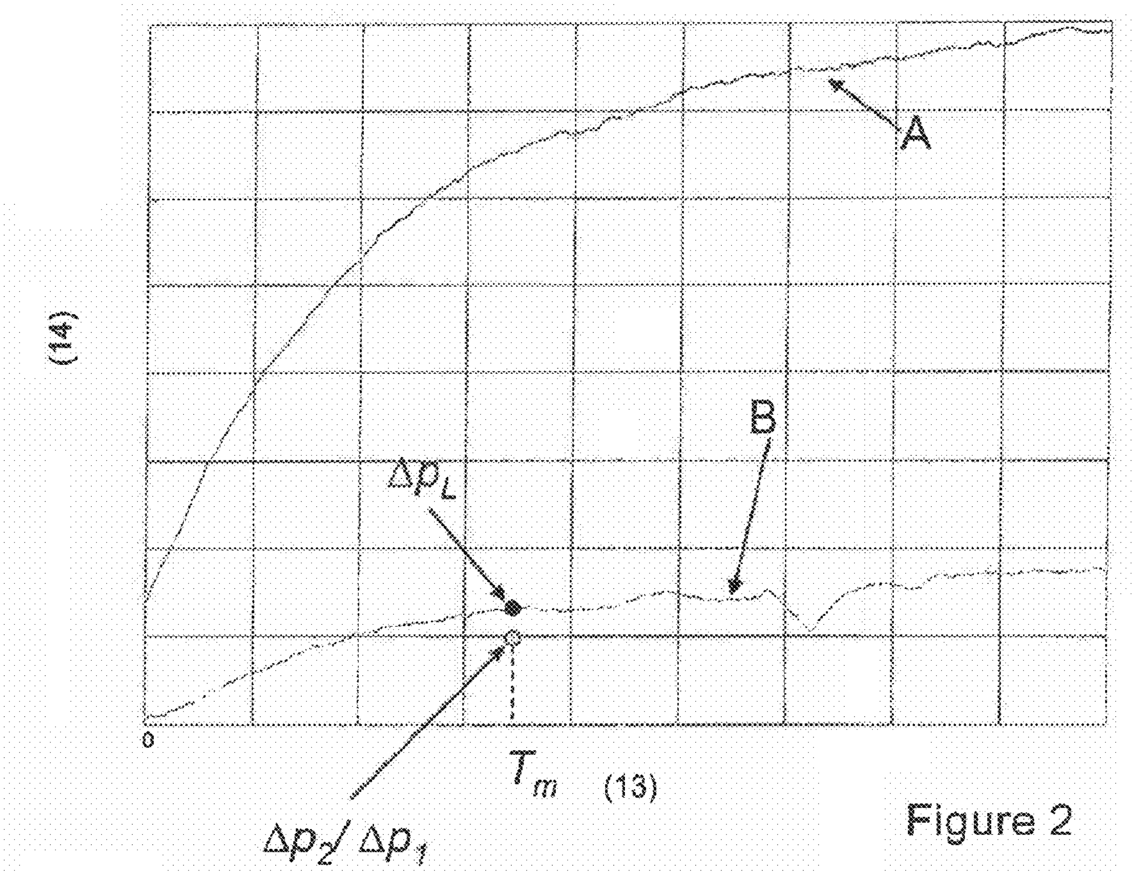
FIG. 2 illustrates a chart depicting reference curves for the ratio of pressure differentials for no-leak and leak scenarios.

FIG. 2 illustrates two reference curves A and B for the ratio $\Delta p_L$, respectively for a no-leak situation and a leak situation (corresponding to a calibrated leak section e.g. an orifice diameter of 0.5 mm for small leak detection in OBD II tests). The axis (13) and (14) represent respectively the time and the ratio of pressure differentials. At time $T_m$, the reference ratio $\Delta p_L$ on curve B is compared to a measured ratio $\Delta p_2/\Delta p_1$. In this case, the reference ratio $\Delta p_L$ is bigger than the measured ratio $\Delta p_2/\Delta p_1$, i.e. there is a leak bigger than the calibrated leak in the fuel system.

Figure 3:
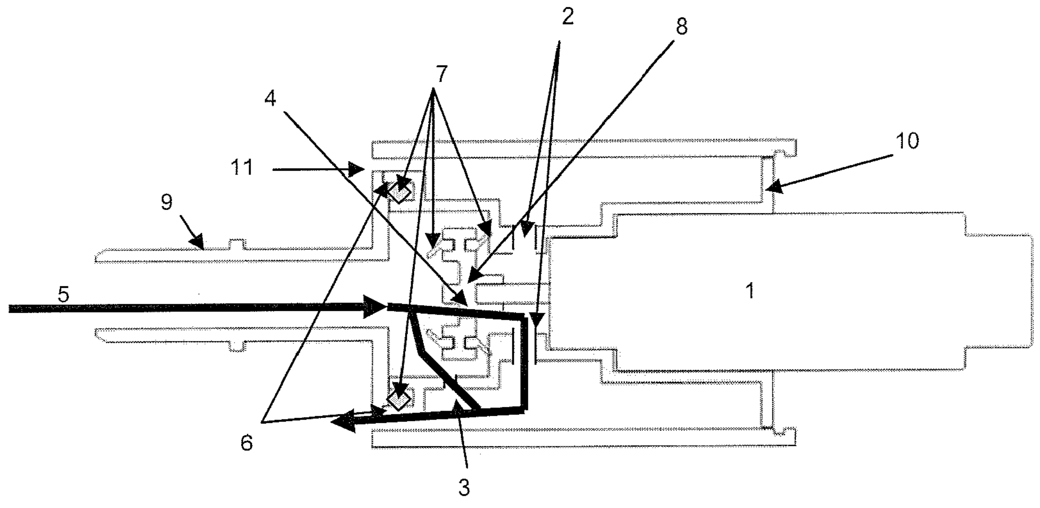
FIG. 3 shows a cross-sectional view of a valve in a first position according to another embodiment of the present invention.
Figure 4:
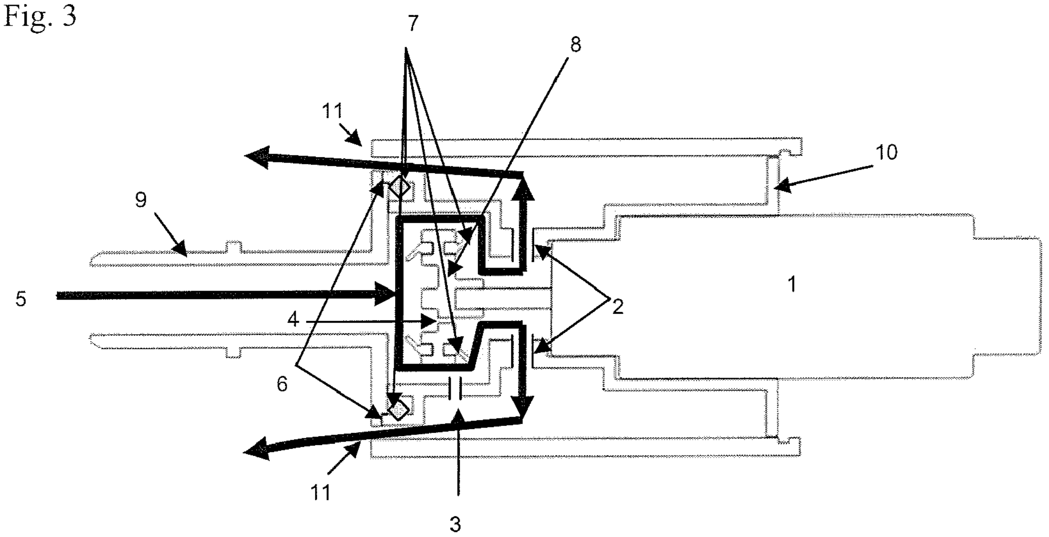
FIG. 4 shows a cross-sectional view of a valve in a second position according to the other embodiment of the present invention.
Figure 5:
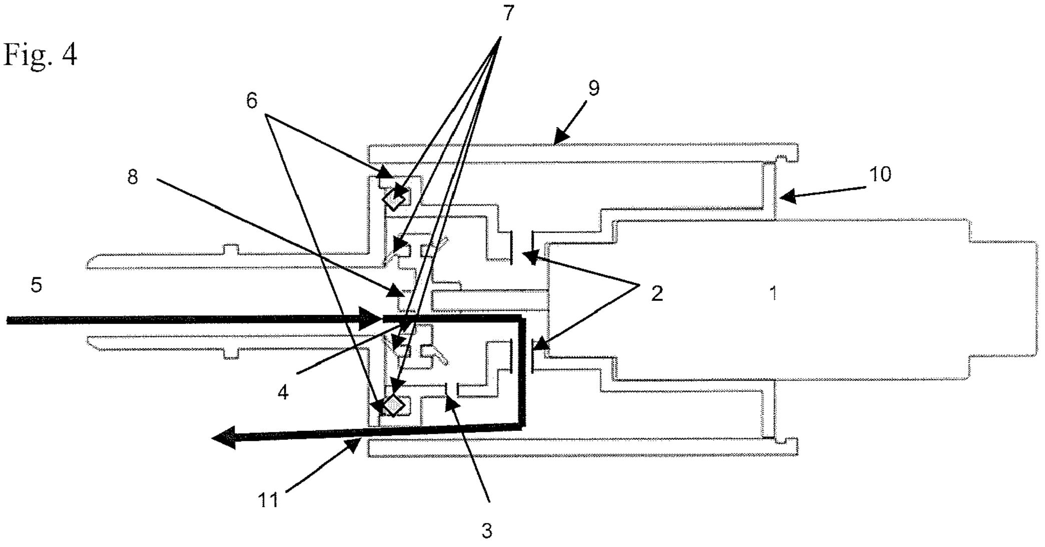
FIG. 5 shows a cross-sectional view of a valve in a third position according to the other embodiment of the present invention.
Figure 6:
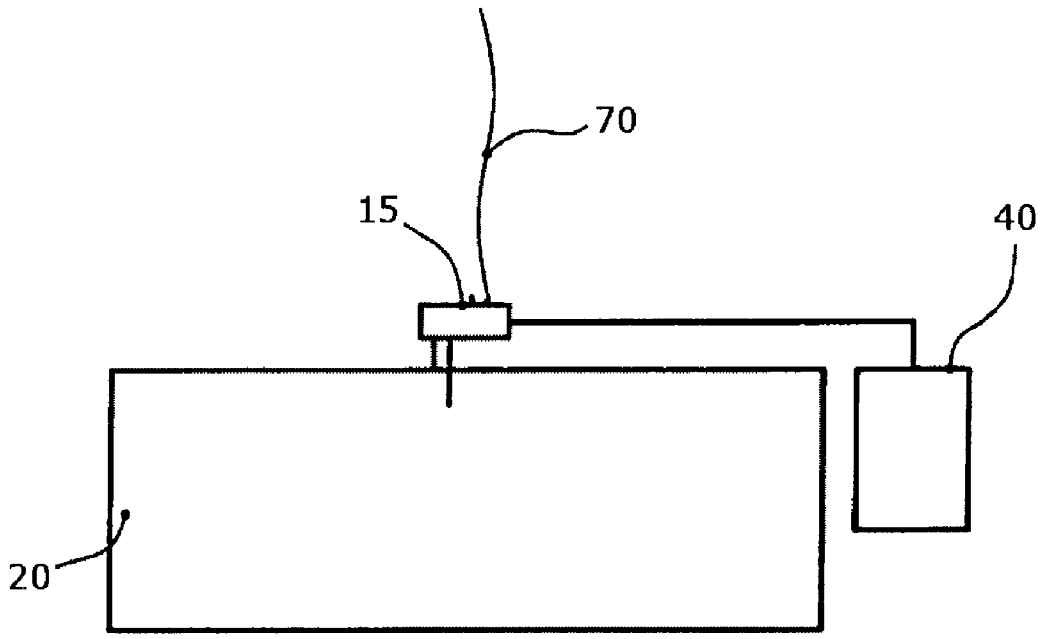
FIG. 6 shows a schematic view of a fuel system equipped with leak detection means according to an exemplary embodiment where the system includes a valve (15) according to the below-described embodiments, a fuel tank (20), a vapor canister (40), fluid communication between the valve (15) and the fuel tank (20), and an electronic communication line (70) to communicate with a control unit.

FIGS. 3 to 5 illustrate a preferred embodiment of a valve as described above allowing to vary in a controlled manner, the flow path between the fuel tank and the atmosphere.

This valve comprises:

- a stepper motor or solenoid (1) which moves a mobile part (8) which is in the form of a blocking plate of puck having a small orifice (4) of about 1 mm diameter;
- an outer housing (9) having an inlet port (5) connected to a canister (not shown) and at least 2 outlet orifices (11); it preferably includes multiple outlet orifices for a common flow path out of the valve with ample capacity for any position.
- an inner housing (10) open at its bottom defining hence an inlet port (orifice) and having several outlet orifices: at least 2 vent ports (2) of large size (about 8 mm×12 mm in size; they just need ample area for proper flow at maximum condition) and at least one small size bleeding orifice (3) of about 1 mm diameter.

The inner housing (10) is provided with retention clips (6) enabling it to be clipped (snap fit) within the outer housing (9). It may have clips at the bottom or a clip at the top holding it together.

There are seals (7) in the valve which seal the puck (8) to the upper and lower housings (9, 10) and also seal the upper and lower housings (9, 10) together.

This valve has 3 positions, respectively shown in FIGS. 3 to 5:

- In FIG. 3, the vent ports (2) are blocked by the puck (8) and its seals (7), but there are nevertheless 2 flow paths for the gas, indicated by the thick lines and arrows on the figure: one directly through restricted orifice (3) and one first through orifice (4) in the puck (8) and thereafter, through the vent ports (2). This position corresponds to the large orifice of the OBD test described in this application and hence, to the large leak path.

In FIG. 4, the puck has moved from its upper seat, liberating the vent ports (2) and allowing gas to flow freely around it from the inlet port (5) of the valve to its outlet ports (11) though said vent ports (2) essentially (the bleeding orifices (3, 4) are free as well but flow there through is negligible). This is the natural, unpowered state of the valve. The actuator will be designed to rest in this position. If a solenoid actuator is used, it preferably has springs incorporated into it so this state is maintained while at rest. If a stepper motor is used, it will have to be a programmed position to return to. This is the state the valve will be in while not running a test i.e. during normal service (functioning) of the tank and while refueling. This is also the default location of the inner part in the event of an actuator malfunction or failure.

In FIG. 5, the puck (8) is sitting (sealed by means of its seals (7)) on the outer housing (9), closing off communication between said outer housing (9) and the inner one (10), except for a small leak flow path through orifice (4). The gas flow entering the valve through inlet port (5) will be forced through this orifice (4) and will reach the valve outlet (11) essentially through the vent ports (2). This position corresponds to the small orifice of the OBD test described in this application and hence, to the small leak path.

The invention claimed is:

1. A method of detecting a leak in a fuel system comprising a fuel tank and an orifice with a controlled section between the tank and the atmosphere, according to which:

a) the controlled section is set to a value $A_1$ at a time $T_1$ and a pressure differential $\Delta p_1$ between the inside of said fuel tank and the atmosphere is measured at least after an interval of time $\Delta T$ from $T_1$, for a constant fuel flow out of said fuel tank;

b) the controlled section is set to a value $A_2$ at a time $T_2$ and a pressure differential $\Delta p_2$ between the inside of said fuel tank and the atmosphere is measured at least after the same interval of time $\Delta T$ from $T_2$, for the same constant fuel flow;

c) a ratio of said pressure differentials $\Delta p_1$ and $\Delta p_2$ is computed and is compared to a reference pressure differential ratio $\Delta p_L$ obtained with the same fuel system but comprising a calibrated leak; and d) a leak bigger than said calibrated leak is detected if said ratio computed at stage c) is smaller than said reference ratio $\Delta p_L$.

2. The method according to claim 1, wherein the fuel system comprises an evaporative emission control system comprising a canister and an electronically controlled electromechanical valve, wherein the orifice of controlled section is between the fuel tank and the canister, and wherein said controlled section is controlled by the electromechanical valve.

3. The method according to claim 2, wherein said valve comprises a stationary outer housing comprising at least three bores, and a translating inner section which translates along the primary axis of the outer housing and which comprises adequate bores defining with the bores of the housing at least three ports of the valve.

4. The method according to claim 1, wherein the orifice of controlled section is in between the vent port of a canister, and the atmosphere and is controlled by a vent valve allowing to vent the tank during normal service and during refueling.

5. The method according to claim 1, wherein the fuel system comprises a fuel system control unit (FSCU), and wherein steps a) to d) are performed by the FSCU.

6. The method according to claim 5, wherein said fuel system comprises a fuel pump, and wherein said fuel flow is controlled by said fuel pump which is controlled by said FSCU.

7. The method according to claim 6, wherein said fuel pump is controlled through a variable speed/variable pressure control program.

8. The method according to claim 1, wherein said pressure differentials $\Delta p_1$ and $\Delta p_2$ are measured only once after the interval of time $\Delta T$ from respectively $T_1$, and $T_2$.

9. The method according to claim 1, wherein a) said pressure differential $\Delta p_1$ is measured after successive intervals of time $\Delta T$ starting from $T_1$ in such a manner as to obtain one sequence of N measurements where N is a constant;

b) said pressure differentials $\Delta p_2$ is measured after successive intervals of time $\Delta T$ starting from $T_2$ in such a manner as to obtain one sequence of N measurements; and c) a sequence of N ratios of said pressure differentials $\Delta p_1$ and $\Delta p_2$ is computed from sequences of measurements obtained at stages a) and b), a numerical filter is applied to this sequence of N ratios in such a manner as to obtain a sequence of N filtered ratios, and said sequence of filtered ratios is compared to a sequence of N reference pressure differential ratios $\Delta p_L$, obtained with the same fuel system but comprising a calibrated leak.

10. The method according to claim 1, wherein said method is included in an on-board diagnostic (OBD) test.

11. A fuel system equipped with leak detection means, said fuel system comprising:

a) a fuel tank;

b) an orifice with a controlled section between the tank and the atmosphere;

c) means for varying said controlled section between at least two values;

d) means for measuring a pressure differential between the inside of the tank and the atmosphere at said at least two values of said controlled section; and e) means for computing a ratio between two pressure differentials measured by the means for measuring a pressure differential at stage d) and for comparing said ratio with a reference pressure differential ratio obtained with the same fuel system but with a calibrated leak and the atmosphere.

12. The fuel system according to claim 11, wherein the means for varying the controlled section are included into a valve which is located between a canister and the atmosphere and which is a vent valve allowing to vent the tank during normal service and during refueling.

* * * * *